United States Patent
Tchaaouaou et al.

(10) Patent No.: US 10,601,211 B2
(45) Date of Patent: Mar. 24, 2020

(54) COIL FOR HANDLING OVERLENGTH OF AN ELECTRICAL CABLE

(71) Applicant: Safran Electrical & Power, Blagnac (FR)

(72) Inventors: Ismail Tchaaouaou, Blagnac (FR); Mickael Rubio, Blagnac (FR); Frédéric Colin, Plaisance du Touch (FR)

(73) Assignee: Safran Electrical & Power, Blagnac (FR)

( * ) Notice: Subject to any disclaimer, the term of this patent is extended or adjusted under 35 U.S.C. 154(b) by 0 days.

(21) Appl. No.: 16/073,242

(22) PCT Filed: Jan. 27, 2017

(86) PCT No.: PCT/FR2017/050197
§ 371 (c)(1),
(2) Date: Jul. 26, 2018

(87) PCT Pub. No.: WO2017/129923
PCT Pub. Date: Aug. 3, 2017

(65) Prior Publication Data
US 2019/0036318 A1 Jan. 31, 2019

(30) Foreign Application Priority Data

Jan. 28, 2016 (FR) ..................... 16 50695

(51) Int. Cl.
*H02G 3/32* (2006.01)
*H01B 7/00* (2006.01)

(52) U.S. Cl.
CPC ............ *H02G 3/32* (2013.01); *H01B 7/0045* (2013.01); *B64D 2221/00* (2013.01)

(58) Field of Classification Search
None
See application file for complete search history.

(56) References Cited

U.S. PATENT DOCUMENTS

| 2,134,946 A | * | 11/1938 | Hurley | H04B 15/025 123/169 PH |
| 2,902,821 A | * | 9/1959 | Kelly, Jr. | A44C 5/102 174/146 |
| 4,366,939 A | * | 1/1983 | McMillan | F16L 3/223 248/49 |
| 5,168,842 A | * | 12/1992 | Brooks | F02F 7/006 123/143 C |

(Continued)

FOREIGN PATENT DOCUMENTS

CA 2 475 261 A1 1/2006

*Primary Examiner* — Timothy J Thompson
*Assistant Examiner* — Muhammed Azam
(74) *Attorney, Agent, or Firm* — Blank Rome LLP

(57) ABSTRACT

An assembly includes a harness. The harness includes a plurality of electrical cables and a coil. The coil has a body on which said cables are fixed. The coil includes arms mounted on said body, at a first end, each arm having a second end on which one of said cables is fixed. The second end is movable with respect to the body, independently of the second ends of the other arms, between a position for maximum absorption of overlength of cable, in which the second end is remote from the body, and a position for maximum creation of overlength of cable, in which the second end is closer to the body.

10 Claims, 3 Drawing Sheets

(56) References Cited

U.S. PATENT DOCUMENTS

| | | | | |
|---|---|---|---|---|
| 5,367,127 A | * | 11/1994 | Dormon | F16L 3/22 |
| | | | | 174/146 |
| 5,564,658 A | * | 10/1996 | Rinderer | F16L 3/22 |
| | | | | 248/49 |
| 6,552,270 B1 | * | 4/2003 | Heacox | F16L 3/233 |
| | | | | 174/135 |
| 6,710,249 B1 | * | 3/2004 | Denton | H01B 7/0045 |
| | | | | 16/2.2 |
| 6,979,776 B1 | * | 12/2005 | Zimmermann | H02G 1/06 |
| | | | | 138/111 |
| D597,403 S | * | 8/2009 | Ho | D8/356 |
| 9,155,976 B1 | * | 10/2015 | Mosquera | A63H 33/08 |
| 2005/0145582 A1 | | 7/2005 | Dubon et al. | |

\* cited by examiner

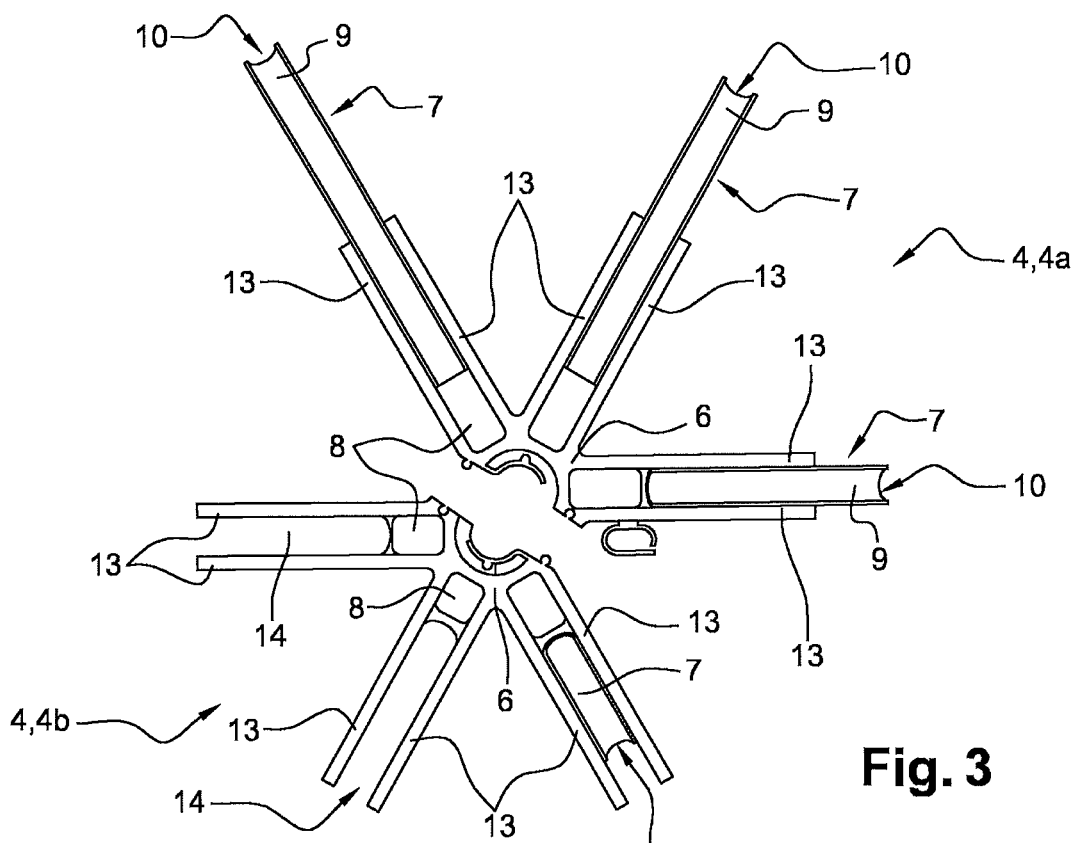
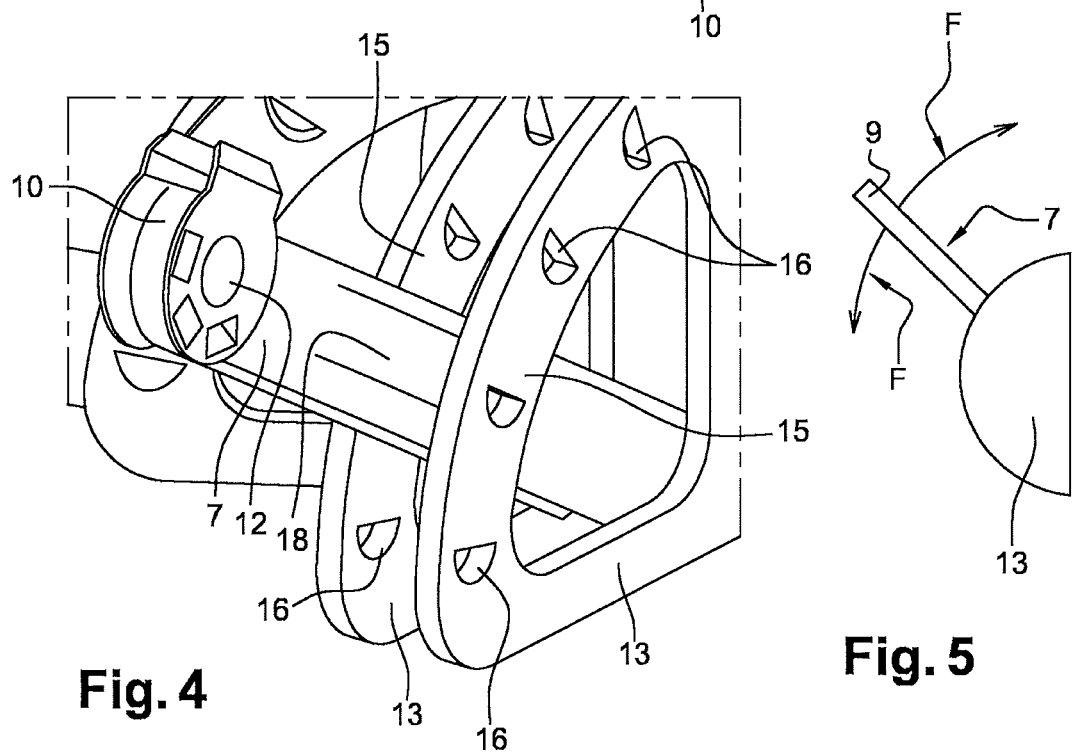
Fig. 3
Fig. 4
Fig. 5

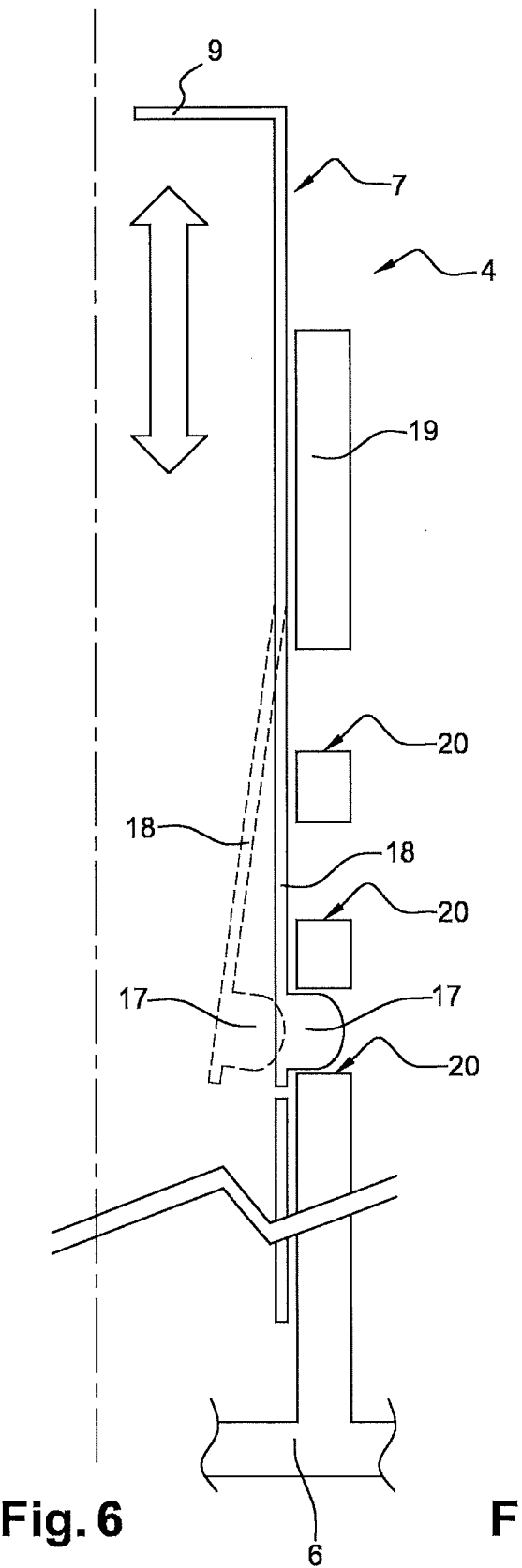
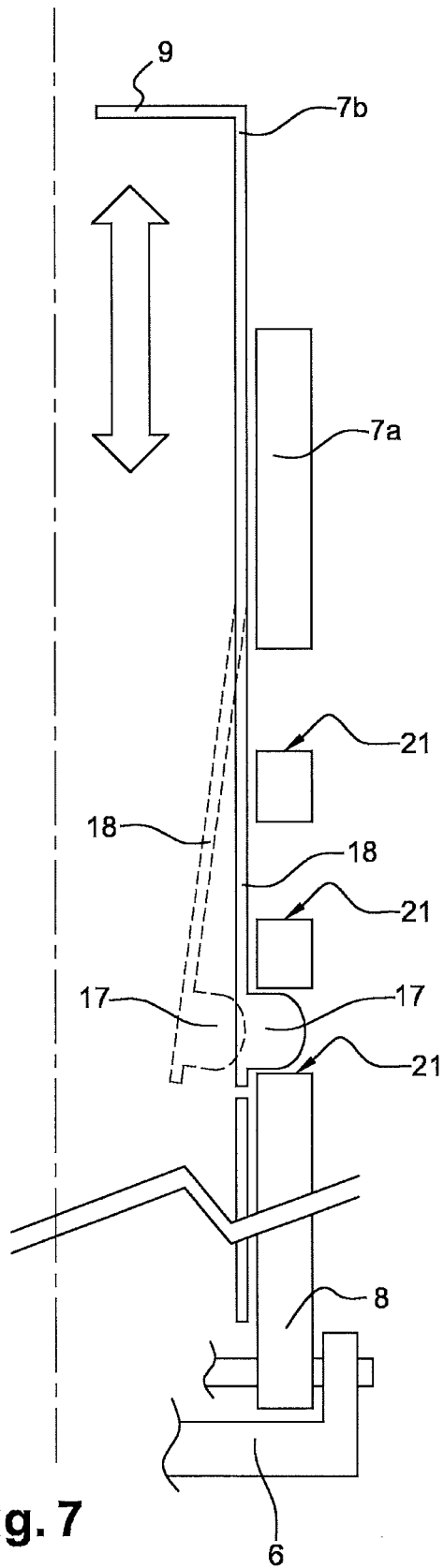

COIL FOR HANDLING OVERLENGTH OF AN ELECTRICAL CABLE

CROSS-REFERENCE TO RELATED APPLICATIONS

This application is a national stage of International Application No. PCT/FR2017/050197, filed on Jan. 27, 2017, which claims the benefit of French Patent Application No. 1650695, filed on Jan. 28, 2016, the contents of each of which are incorporated herein by reference.

TECHNICAL FIELD

The present invention relates to a coil for handling overlength of an electrical cable in an electrical harness wound as a coil.

BACKGROUND

For ease of manufacture, aircrafts are built in segments end-jointed together, which are then transported to an assembly site.

Each segment comprises a structural portion, a skin and a circuit for fluidic as well as energetic transmission, like an electrical circuit. The electrical circuit comprises various electrical harnesses, each having several electrical cables, with the harnesses of two segments being connected together by connectors.

Each cable in an electrical harness has an effective section and an overlength section making it possible to create, on the one hand, a repair length used for repairing a cable when the latter is damaged, and on the other hand, a water droplet-shaped length making it possible to create, on the cable, a U-shaped area along which condensed water streams not to reach the end of the cables and thus the harness connectors.

To facilitate the connection between the harnesses of two abutting segments, the connectors are preferably positioned at a predetermined position on the respective segment thereof, i.e. the cables all extend in the same plane at least at one end of the harness so that mounting each of the cables in a common connection is easy.

The predetermined position and the overlength portion of the cables in the harnesses make it necessary to tension the harness so that it cannot move when the aircraft is flying, since the movement of a harness creates vibrations and unpleasant noise for the passengers on the aircraft.

A known technique for tensioning harnesses consists in fixing the harness at at least one point on a structural crossbeam of the segment, using clamp collars, so that the harness has alternating troughs and crests with respect to the crossbeam, with the troughs and crests absorbing the overlength of the harness.

This technique is particularly suitable for installing harnesses on the segments but has the main drawback of requiring a large number of clamp collars and a significant force from the mounting operators to hold the harness on the crossbeam, because of the heavy weight of an electrical harness.

Besides, this technique is not really, or even not at all suitable, when one of the cables has to be repaired.

As a matter of fact, repairing a cable reduces the length thereof, so that said cable has to be removed from the harness since its shortened length does not make it possible for such cable to follow the initial set of troughs and crests of the harness. When a cable is detached from the harness, it should be fixed separately from the harness either on the structural crossbeam or on the harness itself.

Separately fixing said repaired cable increases the number of clamp collars and extends the time required for the maintenance operation during which said cable is repaired. The duration of the maintenance operation is further extended by the need, for the operator, to remove the cable to be repaired from each collar, and this operation can be tiring for the operator, when said cable to be repaired is jammed and held very tight by other cables in the harness.

Eventually, the alternating troughs and crests in the harness require an important space which cannot be used for other purposes such as fixing other elements of the aircraft, for instance.

SUMMARY

The invention particularly aims at providing a simple, efficient and economical remedy to this problem.

For this purpose, the invention provides an assembly comprising:
a harness which comprises several electrical cables parallel to each other, and
a coil which has a body which said cables are held to, with the body extending parallel to a then common direction of extension of the electrical cables,
with the coil comprising arms mounted on said body, at one end, with each arm having a second end on which one of said cables is fixed, with the second end of each arm being movable with respect to the body, independently of the second ends of the other arms, between a position for maximum absorption of overlength of cable, in which the second end is radially remote from the body, and a position for maximum creation of overlength of cable, in which the second end is closer to the body, so that, by adjusting the positions of the second ends of the arms with respect to the body in the position for maximum absorption or for maximum creation of overlength or in intermediate positions between said positions for maximum absorption and for maximum creation of overlength, the cables all extend in a same plane at least at one end of the harness.

Such coil enables a simple and quick adjustment of each cable in the harness with respect to the other cables. Fitting and maintaining the harness on the aircraft or on the segment is then easier for the operators.

Advantageously, each arm is pivotally mounted on the body at its first end.

The operators can then handle the arms through a simple rotational movement which requires no tools.

To guide the rotation of the arms and help the mounting operator in his/her work, the body of the coil comprises pairs of brackets projecting outwards radially to the body, with the brackets defining between same a housing in which one said arm is mounted.

According to one special characteristic, in pairs, the brackets each have a rounded edge provided with openings adapted to receive at least one pin integral with the arms to define at least said intermediate positions of the arm between the position for creation and for absorption of overlength of cable.

Fine adjustment is then possible for each cable independently.

According to one embodiment, each arm is a telescopic arm comprising a first portion bearing the first end and a second portion telescopic with respect to the first portion and bearing the second end.

This alternative embodiment also enables fine adjustments of each of the cables, with the second portion being able to slide quickly and easily as compared to the first portion of the arms.

To define intermediate positions between the extreme positions for absorption and creation of overlength, the arms comprise at least one elastically deformable means provided with said at least one pin and the body of the coil comprises tubular projections along which the arms are slidingly mounted, with the tubular projections being provided with slots, in which pins integral with the arms are received so that the second end of the arms can adopt the position for absorption of overlength, the position for creation of overlength or any intermediate position.

The elastically deformable means provided with said at least one pin makes it possible to make said pin movable so as to enable the arms to move, to control the length of the cables.

Advantageously, the second end of each arm has a groove in which one of the cables in the harness is received and, for each arm, the coil comprises at least one means for holding one of the cables on the second end of one arm.

Thus, the cables are fully integral with the arms, which prevents the cables from slipping on the arms when adjusting the harness.

According to one embodiment, the coil comprises two half-coils which can be assembled together.

As a matter of fact, only a portion of the coil can be used if the harness has few cables, which reduces the overall dimensions of the harness, to the benefit of an easier installation on the aircraft and the space available to the operators for the maintenance of the harnesses.

BRIEF DESCRIPTION OF THE DRAWINGS

The invention will be better understood and other details, characteristics and advantages of the invention will become apparent from reading the following description given by way of non-limiting example with reference to the appended drawings in which:

FIG. 3 is a bottom view showing the coil for absorption of overlength of FIG. 1 in a pre-assembly configuration;

FIG. 4 is a detailed view showing an arm of the coil for absorption of overlength of FIG. 1;

FIG. 5 is a schematic view showing the operation of the coil for absorption of overlength of the preceding figures;

FIG. 6 is a schematic view showing a first alternative embodiment of the coil for absorption of overlength of FIG. 1, and FIG. 7 is a schematic view showing a second alternative embodiment of the coil for absorption of overlength of FIG. 1.

DETAILED DESCRIPTION

Figure 1:
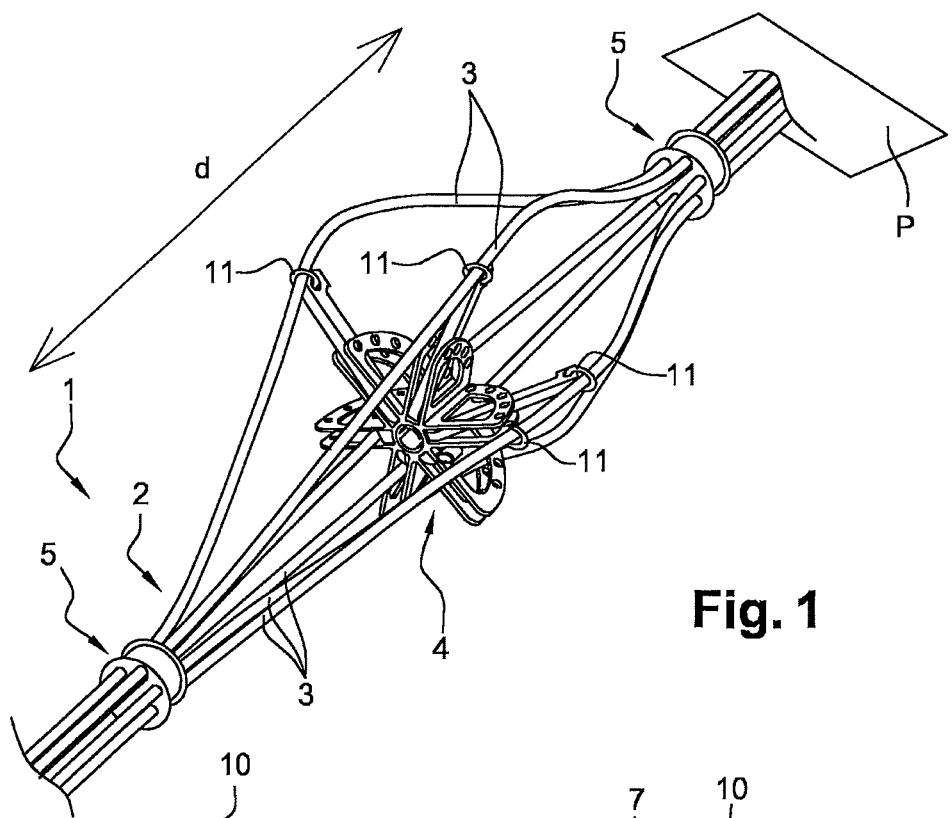
FIG. 1 is a perspective view showing an assembly comprising an electrical harness wound as a coil and a coil for absorption of overlength of cable in the electrical harness.

FIG. 1 shows an assembly 1 comprising:
a harness 2 wound as a coil which comprises several electrical wires 3, and
an overlength controlling coil 4 to which said electrical cables 3 are fixed.

The harness 2 is here an electrical harness 2 which comprises several electrical cables 3, here six, which are held together by cable grommets 5, with the harness 2 having substantially the shape of a sheath. A harness 2 wound as a coil means, here, that the electrical cables 3 forming the harness 2 are substantially mutually parallel and are not twisted together so as not to create zero phase-sequence impedance.

Prior to mounting a harness 2 on a segment of an aircraft, the harness 2 is assembled by an operator which delivers several cables 3 independently of each other and assembles same using cable grommets 5.

The independent delivery of the cables 3 makes the harnesses 2 irregular, i.e. each of the ends of the cables 3 is not exactly in the same plane P as the ends of the other cables 3.

To overcome this drawback, the operator uses at least one coil 4 for handling the overlength which is then positioned between the cables 3 of the harness 2.

Figure 2:
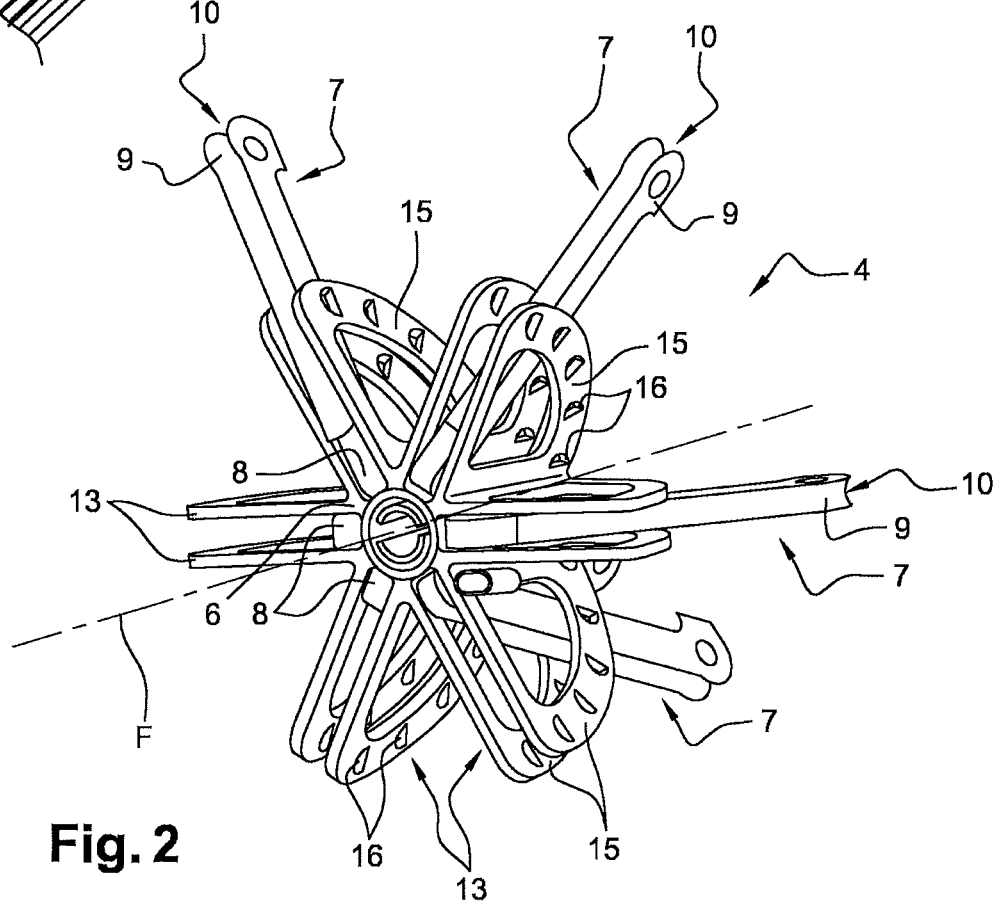
FIG. 2 is a perspective view showing the coil for absorption of overlength of FIG. 1.

The coil 4, shown in perspective in FIG. 2, comprises a body 6 extending in a common direction (d) (see FIG. 1) of extension of the cables 3 connected to the harness 2, and several arms 7 mounted on said body 6, at a first end 8.

The body 6, which may be hollow as shown in the figures, or solid, defines a neutral fiber (F) of the harness 2, i.e. a theoretical fiber having a perfect length of the harness 2, in the direction (d).

Each arm 7 of the coil 4 has a second end 9 to which one of said cables 3 in the harness 2 is fixed.

The second end 9 of each arm 7 is movable with respect to the body 6, independently of the second ends of the other arms 7, between a position for maximum absorption of overlength of cable (hereinafter referred to as the overlength absorption position), in which the second end 9 is radially remote from the body 6, and a position for maximum creation of overlength of cable 3 (hereinafter referred to as the overlength creation position), in which the second end 9 is closer to the body 6. As will be seen below, the second end 9 of the arms 7 can take several intermediate positions between its overlength absorption and overlength creation positions.

The overlength absorption position is used to shorten a cable 3, i.e. to move the end of a cable 3 when the latter is longer than the other ones and the overlength creation position is used to extend a cable 3, i.e. to move the end of a cable 3 when the latter is shorter than the other ones.

Thus, by adjusting the positions of the second ends 9 of the arms 7 with respect to the body 6 in the maximum overlength absorption position, in the overlength creation position or in intermediate positions between the overlength absorption position and the overlength creation position, the cables 3 all extend in the same plane P at least at one end of the harness 2.

When the harness 2 is assembled by an operator, the arms 7 of the coil 4 are placed in an intermediate position so as to enable the adjustment of the length of the cables 3 by moving the second end 9 of the arm 3 towards the overlength creation position thereof or towards the overlength absorption position thereof, as appropriate.

Using several coils 4 on the same harness 2 makes it possible to create several adjustment points along the harness 2, which ensures precise control of the position of each end of a cable 3 with respect to the ends of the other cables 3.

Advantageously, the second end 9 of each arm 7 has a groove 10 in which one of the cables 3 in the harness 2 is received. The groove 10 may have an open profile tapering at an upper end so as to force the cable 3 into said groove 10, so that the latter follows the movement of the arm 7 when adjusting the position of the arm 7.

In addition to the groove 10, one means 11 for holding said cable 3 in said groove 10 may be provided. For example, the means may be a clamping collar 11 going through a hole 12 formed in the second end 9 of the arm 7 and enclosing the arm 7 and the cable 3 to make same integral with each other, as shown in FIG. 1.

According to one aspect, illustrated in FIG. 3, the coil comprises two half-coils 4a, 4b which can be assembled together. Thus, to facilitate the assembly of the electrical harness 2, a first portion of the cables 3 can be mounted on the first half-coil 4a, and then a second portion of the cables 3 on the second half-coil 4b, and finally the two half-coils 4a, 4b can be assembled together to form the coil 4.

For a harness comprising few cables 3, an adapted coil 4 having a number of arms 7 identical with the number of cables 3 in the harness 2 can advantageously be chosen, in order to avoid creating a zero phase-sequence impedance which would be created by using a single half-coil 4a, 4b.

According to a first embodiment shown in FIGS. 1 to 5, the arms 7 of the coil 4 are pivotally mounted on the body 6, with the pivot point of the arms 7 being provided by the first end 8.

To guide the arms 7 in rotation, the coil 4 comprises, for each arm 7, a pair of brackets 13 radially mounted on the body 6 and defining between same a housing 14 in which one arm 7 is mounted.

In order to determine intermediate positions of the arms 7 between the overlength absorption position and the overlength creation position thereof, the brackets 13 have, as shown in FIG. 4, a rounded edge 15 provided with openings 16 adapted to receive at least one pin 17 (FIGS. 6 and 7) integral with one arm 7 which cooperates with the bracket 13 for defining intermediate positions of the arms 7 between the overlength creation and the overlength absorption positions.

Said at least one pin 17 of the arms 7 is integral with an elastically deformable means 18, here an elastically deformable lug enabling said at least one pin 17 to be seated in one opening 16 of a bracket 13 and to be released therefrom to allow the movement of the arm 7 from one intermediate position to another intermediate position, to the overlength absorption position or to the overlength absorption creation position.

The overlength creation position is reached when said at least one pin 17 is in one opening 16 closest to the body 6 and the overlength absorption position is reached when said at least one pin 17 is in one opening 16 furthest from the body 6, i.e. the opening 16 farthest from the central axis of the body or of the neutral fiber (F) of the coil 4. The displacement of the arms is schematically shown in FIG. 5 by the arrows F.

The arms 7 preferably comprise two pins 13, with each pin 17 being adapted to cooperate with the openings 16 of one of the brackets 13 in a pair.

According to a second embodiment, shown in FIG. 6, the arms 7 are telescopic.

For this purpose, the body 6 comprises several tubular projections 19 along which the arms 7 are received. The tubular projections 19 may form an integral part with the body 6 or be added onto the body 6 and secured thereto using appropriate means.

Each tubular projection 19 comprises at least one series of slots 20 adapted to receive at least one pin 17 integral with one arm 7 slidably mounted in the tubular projection 19, in order to define intermediate positions of the arms 7 between the overlength creation and overlength absorption positions.

The overlength creation position is reached when said at least one pin 17 is in a slot 20 closest to the body 6 and the overlength absorption position is reached when said at least one pin 17 is in a slot 20 furthest from the body 6.

Said at least one pin 17 of the arms 7 is integral with an elastically deformable means 18, here an elastically deformable lug enabling said at least one pin 17 to be seated in a slot 20 of a tubular projection 19 and to be released therefrom to allow the displacement of the arm 7 from an intermediate position to another intermediate position, to the overlength absorption position or to the overlength creation position.

The tubular projections 19 preferably comprise two mutually opposed series of slots 20 and the arms 7 comprise two pins 17, with each pin 17 being adapted to cooperate with the slots 20 of one series of tubular projections 19.

According to a third embodiment shown in FIG. 7, the coil 4 is a combination of the first two embodiments.

In this third embodiment, the arms 7 comprise a first portion 7a through which the arm 7 is pivotally mounted on the body 6, and 7b a second portion telescopic with respect to the first portion 7a and bearing the second end 9.

The first portion 7a of each arm 7 comprises at least one series of apertures 21 adapted to receive at least one pin 17 integral with the second portion 7b of the arm 7 in order to define intermediate positions of the arms 7 between the overlength creation and the overlength absorption positions.

The overlength creation position is reached when said at least one pin 17 is in one aperture 21 closest to the body 6 and the overlength absorption position is reached when said at least one pin 17 is in one aperture 21 furthest from the body 6.

Said at least one pin 17 of the second portion 7b of the arms 7 is integral with an elastically deformable means, here an elastically deformable lug enabling said at least one pin 17 to be seated in one aperture 21 of the first portion 7a of an arm 7 and to be released therefrom to allow the displacement of the second portion 7b of the arm from one intermediate position to another intermediate position, to the overlength absorption position or to the overlength creation position.

The first portion 7a of the arms 7 preferably comprises two series of mutually opposite apertures 21 and the second portion 7b of the arms 7 comprises two pins 17, with each pin 17 being adapted to cooperate with the apertures 21 of one of the series of the first portion 7a of the arms 7.

As an alternative to the elastically deformable lug, the elastically deformable means 18 could be a spring mounted in a cage and pushing the pin 17 so that it projects from the arm 7. Thus, pressing on the pin 17, in opposition to the spring, will move the arm 7 and no pressing on the pin 17 will cause the projection of the pin 17 from the arm 7, especially 7 to lock the arm in a desired position.

The assembly which has just been described, and specifically the coil 4, offers many advantages.

First, the coil 4 is easy to use since the arms 7 can be handled simply and independently of each other. Thus, the adjustment of a single cable 3 in a harness 2 is simple, fast and accurate.

Second, assembling the aircrafts is easier since the harnesses 2 are assembled prior to being mounted on the segments. The length of the harnesses 2 can then be adjusted almost permanently prior to the positioning thereof on the segment, with the final adjustments being possibly made quickly and easily in situ as mentioned above.

Third, maintaining, and specifically repairing one of the cables 3 in a harness 2 is facilitated. As a matter of fact, each of the cables 3 can be repaired independently of the other by lengthening by simple handling of an associated arm 7 of one or more coils 4. Handling the arms 7 further makes it possible to keep the advantage of overlengths so that safety standards can be met, especially as regards the water droplet-shaped overlength.

Eventually, the coils 4 have simple design and construction and facilitate the mounting of the harnesses 2 since cable retaining means only are required, for instance clamping collars 11. Assembling operators then no longer need cutting tools such as pliers or knives for adjusting the length of each of the cables 3 in a harness 2, since such tools might damage the cables 3 further to mishandling.

The invention claimed is:

1. An assembly intended to form an electrical path, with said assembly comprising:
   a harness which comprises several electrical cables parallel to each other, and
   a coil which has a body which said electrical cables are held to, with the body extending parallel to a common direction of extension of the electrical cables, and arms,
   wherein the arms each have a first end and a second end, with the second end of each arm being movable with respect to the body, with the arms being mounted on said body, on one of the first and second ends, with at least one of said electrical cables being fixed on the second end of each arm, with the second end of each arm being movable, independently of the second ends of the other arms, between a position for maximum absorption of overlength of the at least one of said electrical cable, in which the second end is radially remote from the body, and a position for maximum creation of overlength of the at least one of said electrical cables, in which the second end is closer to the body, so that, by adjusting the positions of the second ends of the arms with respect to the body in the position for maximum absorption or for maximum creation of overlength, or in intermediate positions of the second ends of the arms between said respective positions;
   for maximum absorption of overlength of the at least one of said electrical cables, and
   for maximum creation of overlength of the at least one of said electrical cables, wherein
   the electrical cables all extend in a same plane at least at one end of the harness.

2. The assembly according to claim 1, wherein each arm is pivotally mounted on the body at its first end.

3. The assembly according to claim 1, wherein the body of the coil comprises pairs of brackets projecting outwards radially to the body, with the brackets of each pair of brackets defining therebetween a housing in which one of said arms is mounted.

4. The assembly according to claim 3, wherein each of the brackets in pair of brackets has a rounded edge provided with openings adapted to receive at least one pin integral with the one arm mounted between the pair of brackets to define said intermediate positions of the second end of the one arm.

5. The assembly according to claim 1, wherein each arm is a telescopic arm comprising a first portion bearing the first end and a second portion telescopic with respect to the first portion and bearing the second end.

6. The assembly according to claim 1, wherein the body of the coil comprises tubular projections along which the arms are slidingly mounted, with the tubular projections being provided with slots in which pins integral with the arms are received so that the second end of each arm can adopt the position for maximum absorption of overlength, the position for maximum creation of overlength or one of said intermediate positions.

7. The assembly according to claim 4, wherein the arms comprise at least one elastically deformable element provided with said at least one pin, to make said least one pin movable.

8. The assembly according to claim 1, wherein the second end of each arm has a groove in which one of the electrical cables of the harness is received.

9. The assembly according to claim 1, wherein for each arm, the coil comprises at least one element for holding one of the electrical cables on the second end of each arm.

10. The assembly according to claim 1, wherein the coil comprises two half-coils which can be assembled together.

* * * * *